W. C. BROWN.
SPEEDOMETER.
APPLICATION FILED AUG. 14, 1909.
1,202,265.
Patented Oct. 24, 1916.
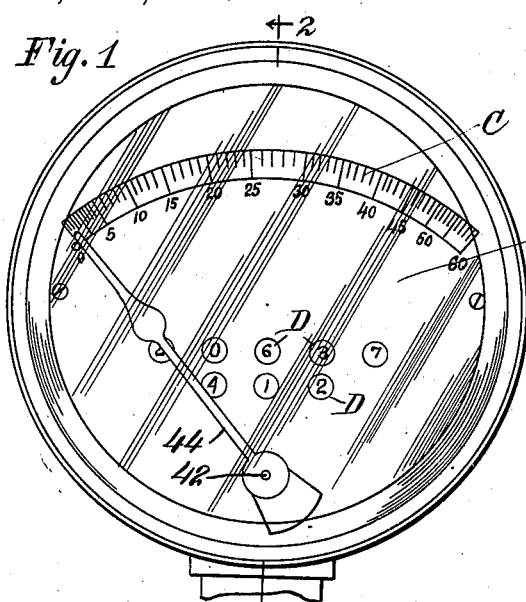
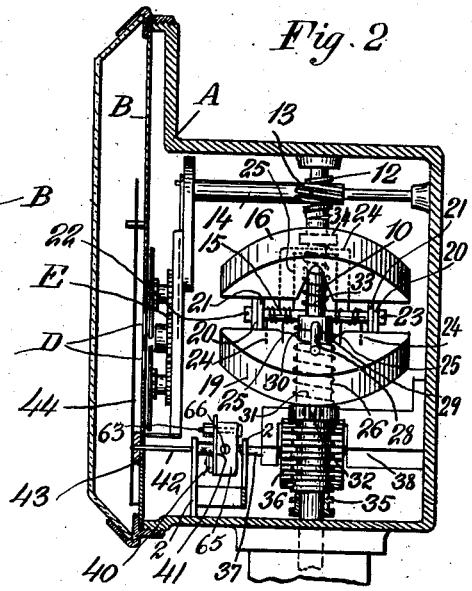
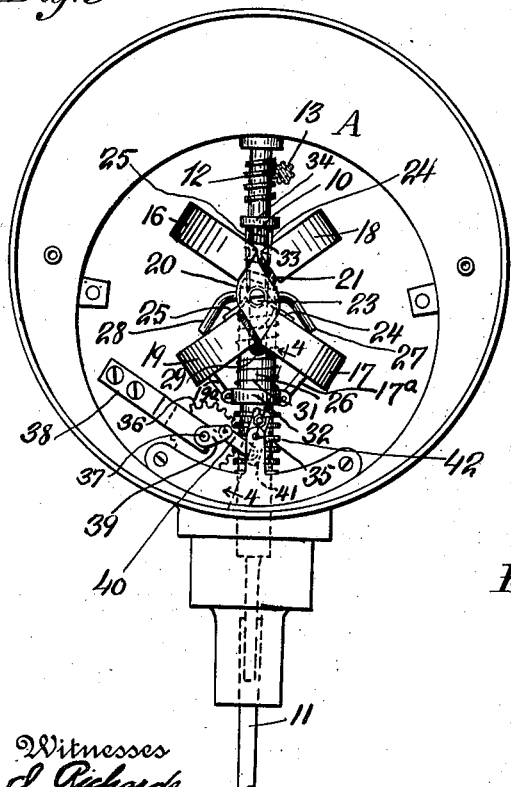
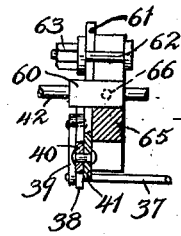
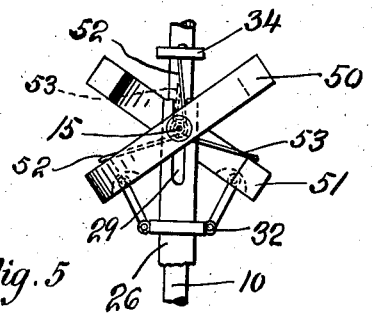

UNITED STATES PATENT OFFICE.

WILBUR C. BROWN, OF FOSTORIA, OHIO.

SPEEDOMETER.

1,202,265.  Specification of Letters Patent.  Patented Oct. 24, 1916.

Application filed August 14, 1909. Serial No. 512,805.

*To all whom it may concern:*

Be it known that I, WILBUR C. BROWN, a citizen of the United States, and a resident of Fostoria, Seneca county, State of Ohio, have invented certain new and useful Improvements in Speedometers, of which the following is a specification.

My invention relates to speedometers for indicating and registering the speed of movement of machinery and particularly power driven vehicles, such as automobiles, by means operatively connected to the machinery or moving parts of the vehicle.

One of the objects of the invention is to produce a speedometer which will accurately indicate low as well as high speed.

Another object is to provide a speedometer of simple durable construction and which will be positive and reliable in action at all speeds.

Another object is to produce a speedometer having a governor which at all speeds will be in perfect balance.

Other objects will appear from the hereinafter description.

The invention consists of the novel construction, arrangement and combination of parts hereinafter illustrated and described and particularly pointed out in the claims.

The invention is illustrated in the accompanying drawing in which the same reference character indicates the same part in the several views.

Referring to the drawing: Figure 1 is a front view of the speedometer. Fig. 2 is a vertical section of the speedometer, the section being taken through the surrounding casing and face-plate as indicated on line 2—2 of Fig. 1, the gear 35 being broken away at its lower end and the supporting frame for the bearings of the shaft 42 being also in section. Fig. 3 is a front view with the dial, hands and registering mechanism removed to clearly show the means for operating the pointer which indicates the speed at which the vehicle is moving. Fig. 4 is a detail view partly in section on line 4 4 of Fig. 3. Fig. 5 is a view of a modified construction.

A is a casing within which the operating parts of the speedometer are inclosed. In front of this casing is a dial B, having graduations C marked thereon representing miles, and openings D through which the figures of the registering apparatus show. Journaled in the casing is a perpendicular shaft 10, which is driven by a flexible shaft 11 connected in the usual manner to a rotating part of the vehicle on which the speedometer is used. On the upper end of the shaft 10 is a worm 12 which meshes with a gear 13 on a transverse shaft 14, which operates the register E. This registering apparatus forms no part of my present invention. Secured to the shaft 10 is a pin 15 the ends of which project on opposite sides of said shaft.

16 and 17 and 18 and 19 are weights, the first two being connected by the plates 20 and the other two by the plates 21. 22 and 23 are screws which pass through holes in these plates and are screwed into the ends of the pin 15 by which said weights are loosely pivoted to the pin. These weights are so connected and arranged that 16 and 19 are on one side of the shaft and 18 and 17 on the other, and the weights 16 and 18 are above 17 and 19.

24 is a spring wire, the middle portion of which rests against the shaft 10, the two ends extending downwardly and are coiled around each end of the pin 15, with the free ends thereof resting on the weight 17. 25 is a spring wire on the opposite side of the shaft 10, the ends of which extend downwardly and are also coiled around each end of the pin 15 with the free end resting against the upper surface of the weight 19. These wires form springs which normally tend to govern the weights 16 and 17, and 18 and 19, respectively, and hold them in the position shown in the drawing. When the shaft 10 is rotated, centrifugal motion causes these weights to assume a more or less horizontal position against the tension of the springs, according to the speed at which the shaft is moving. Loosely mounted on this shaft 10 and adapted to slide longitudinally thereon, is a sleeve 26. Secured to the upper end of the sleeve are the fingers 27 and 28 which rest on the upper faces, respectively of the weights 17 and 19. The upper end of this sleeve is slotted at 29 and 30 to permit the upper end of the sleeve to be raised above the pin 15.

Surrounding the upper end of the sleeve 26 is a coil spring 31, one end of which rests under the fingers 27 and 28, and the other end against a collar 32 mounted to have slidable movement relatively to said sleeve. This collar is connected to the weights 17 and 19 by links 17ª and 19ª, so that when the weights move outwardly the links will pull up the collar and compress the spring 31 and thereby create a force which opposes movement of the weights. Surrounding the shaft 10 above the upper end of the sleeve 26 is a coil spring 33 the upper end of which bears against the under side of a collar 34 secured to said shaft, and the other against the upper end of the sleeve 26. When the shaft 10 is rotated the weights are thrown out by centrifugal force, the lower weights 17 and 19 lift the sleeve through the fingers 27 and 28 and compress the coil springs, the upper end of the lower coil spring bearing against the under surface of the pin 15 during the upward movement of the sleeve. When the rotary speed of the shaft is reduced or stopped, these coil springs force the sleeve downwardly to its normal position. The spring 33 is used to assist the springs 24 and 25 in checking or overcoming the centrifugal movement of the weights at high speed. The spring 33, however, may be dispensed with. On the lower end of the sleeve 26 is a suitable gear 35 which meshes with a gear 36 mounted on a shaft 37 secured in a bearing 38. On the front end of the shaft is an arm 39. To the free end of this arm is pivoted one end of a link 40, the other end of the link being pivotally secured to an oscillating arm 41. This arm is secured to a shaft 42 mounted in suitable bearings 2 in the casing. The arm 41 is adjustably secured with respect to the shaft 42, the means preferably employed for the purpose being indicated in Fig. 4. The shaft 42 is constructed with a squared portion 60 intermediate its ends, which squared portion is adapted to fit in a slot or bifurcation 61 in the link 41. Suitable clamping means, as, for example, the bolt 62 and its nut 63, engage the lower side of the block 65 and the upper side of the link 41 to secure said link in an adjustable position with respect to the shaft 42. The block is suitably secured to the shaft 42, as, for example, by the set screw 66. This shaft 42 projects through an opening 43 in the dial B and to the front end is secured the hand or pointer 44. When the shaft 10 is rotated and the weights are thrown out and the sleeve is lifted, as hereinbefore stated, the gear 36 is moved. This movement of the gear 36 is transmitted through the arm 39, the link 40 and adjustable arm 41 to the shaft 42, and the hand 44 is moved over the face of the dial and the speed is indicated by the hand pointing to the proper graduation on the face of the dial. I have adjustably mounted the arm 41 so that the parts can be properly set for the hand to properly indicate the exact speed. This adjustment is necessary in order that the respective positions of these parts may be determined by experiment. The adjustment is also desirable to take up wear on the coacting parts.

By the construction described and illustrated the speed will be accurately indicated, whether the vehicle is moving slowly or at a high speed.

In Fig. 5 I have shown a modified and simpler construction. In this construction instead of having four weights connected as shown in the prior figures, I use only two weights 50 and 51 each of which is pivoted at its center to an end of the pin 15. Connected to the collar 34 on the shaft 10 is one end of a spring 52 which is coiled around one end of the pin 15. The other end of the spring rests freely on the top surface of the lower part of the weight 50. On the opposite side of the shaft 10 is another spring 53 which is coiled around the other end of the pin 15. One end of the spring is connected to the collar 34 and the other end rests on the upper surface of the lower part of the weight 51. When the shaft 10 is rotated the weights 50 and 51 are thrown toward a horizontal position by centrifugal force against the tension of the springs 52 and 53.

My construction of speedometer is such that regardless of the speed of the vehicle to which it is attached, the weights or governors of the speedometer are always in balance and will accurately indicate high or low speed.

It will be noted that the springs 24 and 25, or 52 and 53, are effective in all operative positions of the governor weights and that by reason of the correlation of the plurality of weights and these springs they act to govern the weights at low speeds as well as to contribute to the responsiveness of the weights to any variation in the speed of the shaft with which the device is connected and to a steady movement of the weights at all positions thereof. It will also be noted that the spring 31 becomes effective only after the weights have been thrown to a certain position which they assume when the shaft reaches an intermediate speed of rotation thereof, the correlation of the parts being such that this spring is not compressed sufficiently to give it operative tension until after a certain speed has been reached. The springs 24 and 25 (or 52 and 53), the weights and the spring 31 now mutually act to check the centrifugal force of the weights, to a degree proportioned to such force, thus mutually contributing to the steady movement of the weights from one position to another, without however, rendering the weights irresponsive to any variation of the speed of the shaft. When this middle limit of speed is exceeded and a higher speed reached, the spring 33, which up to this point has remained inactive because insufficiently compressed to be under effective tension, comes into action and assists in the checking of the centrifugal movement of the weights with the results at high speed hereinbefore noted in connection with low and intermediate speeds. This correlation of a plurality of weights and springs, materially contributes to the steady operation and responsiveness, and consequently reliability, at all speeds, which the present device has exhibited, and to this reliability the particular arrangement of the several parts whereby the forces developed are most efficiently utilized has also materially contributed. It will also be noted that the springs 24 and 25 (or 52 and 53) bear directly on the weights and constitute a desirable form of what may properly be regarded as a primary spring element of the governing means for the weights, and that the spring 31 is indirectly connected with the weights, by the sleeve 26 and fingers 27 and 28, as is also the spring 33, and either or both of said springs constitute a desirable form of what may properly be regarded as a secondary spring element.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Having now described my invention, what I claim as new and desire to secure by Letters Patent is:

1. In a speedometer, a rotative shaft, a plurality of weights, means for pivotally connecting the shaft to the weights, and governing means for the weights comprising primary and secondary spring elements which respectively bear upon the weights and are indirectly connected with the weights, the parts being so related that the springs will be effective at successive periods in the speed of rotation of the shaft.

2. In a speedometer, a rotative shaft, two pair of weights, means for pivotally connecting the same to the shaft and extending on opposite sides thereof, springs acting upon a weight of each pair to resist their upward movement caused by centrifugal force, a sleeve on the shaft having outstanding members in engagement with a weight of each pair whereby the sleeve is moved upon the rotation of the shaft, indicating means actuated by the sleeve, and a spring to resist the movement of the sleeve.

3. In a speedometer, an indicating mechanism, a plurality of pairs of centrifugally operated weights, a primary spring element acting upon a weight of each pair to resist centrifugal movement thereof, and operative connections between the weights and the indicating mechanism including a secondary spring element having a plurality of successively operating springs, and means whereby the secondary spring element is connected with a weight of each pair.

4. In a speedometer, an indicating mechanism, a plurality of pairs of centrifugally-operated weights, each pair provided with a spring acting upon a weight thereof to resist centrifugal movement, a rotative shaft supporting said weights, a sleeve slidably mounted upon the shaft, means connecting the sleeve with a weight of each pair, means connecting the sleeve with the indicating mechanism, and a plurality of springs encircling the shaft and engaging the sleeve and successively put under effective tension by the latter.

5. In a speedometer, a rotative shaft, a centrifugal governor comprising weights connected in pairs, means secured to the shaft upon which each pair of weights is pivotally mounted on opposite sides of the shaft, springs acting upon a weight of each pair respectively to resist centrifugal movement of the weights, a sleeve, connections between the sleeve and the weights by means of which the sleeve is moved by the weights, a rack on said sleeve, a gear meshing therewith, a link, means for pivotally connecting the same with the gear, an indicator shaft having a squared portion fitted to the link, means to adjustably hold the link with respect to the indicator shaft, and indicating means operatively connected with the indicator shaft.

6. In a speedometer, a rotative shaft, weights constituting a balanced governor, means for operatively connecting the governor weights to the shaft, a sleeve, means to move the sleeve upon the operation of the governor weights, a rack on said sleeve, a gear meshing therewith, a link, means for pivotally securing the link to said gear, an indicator shaft having a squared portion fitted to a slot in the link, means whereby the link may be adjustably held in position with respect to the indicator shaft, and an indicating arm rigidly attached to the indicator shaft.

7. In a speedometer, a rotative shaft, means for rotating the same, a rack fitted to slide upon the shaft, a spring to retard the movement of the rack in one direction and to assist in moving it in the other direction, a gear meshing with the rack, a pivot for the said gear, a crank arm attached to the pivot of the gear, an indicator shaft, and connections between the crank arm and the indicator shaft.

8. In a speedometer, an indicator shaft provided with a square block, a lever adjustably mounted upon the block, operating means for the lever, connections between one end of the lever and the said operating means to lock the lever, and means for securing the lever in adjustable position upon the indicator shaft to regulate the movement of the indicator shaft.

9. A speed measure comprising a rotatable shaft, a sleeve slidably mounted on said shaft to turn therewith, a rod carried by the shaft, a pair of reversely inclined governor heads mounted on said rod, said heads each connected with said sleeve, an indicator pointer, and connections between the pointer and sleeve whereby the movement of the sleeve will turn the pointer.

10. A speed indicator comprising a vertically arranged rotatable shaft, a sleeve mounted on said shaft and formed on opposite sides with slots, a transverse rod fixed to said shaft and projecting outward through said slots, reversely inclined governor heads mounted on opposite ends of said rod, said governor heads each connected with said sleeve, spring ends bearing on opposite heads, an indicating pointer and connections between the sleeve and pointer whereby the pointer will be moved with the sleeve.

In witness whereof I have hereunto set my hand at the city, county and State of New York, this 7th day of July, 1909.

WILBUR C. BROWN.

In presence of—
ARTHUR B. LA FAR,
GEO. R. COOPER.